United States Patent
Doria

(10) Patent No.: US 10,382,603 B1
(45) Date of Patent: Aug. 13, 2019

(54) FOLDABLE CELLPHONE SHADE ATTACHMENT

(71) Applicant: Frank Doria, Bayville, NY (US)

(72) Inventor: Frank Doria, Bayville, NY (US)

( * ) Notice: Subject to any disclaimer, the term of this patent is extended or adjusted under 35 U.S.C. 154(b) by 0 days.

(21) Appl. No.: 16/288,277

(22) Filed: Feb. 28, 2019

(51) Int. Cl.
*H04M 1/02* (2006.01)

(52) U.S. Cl.
CPC .................. *H04M 1/0279* (2013.01)

(58) Field of Classification Search
CPC combination set(s) only.
See application file for complete search history.

(56) References Cited

U.S. PATENT DOCUMENTS

| | | | |
|---|---|---|---|
| D628,242 S | 11/2010 | Crowder | |
| 8,075,145 B2 | 12/2011 | Engblom | |
| 9,596,332 B2 | 3/2017 | Gander | |
| D793,377 S | 8/2017 | Vinci | |
| D807,869 S | 1/2018 | Petersen | |
| 2006/0274493 A1* | 12/2006 | Richardson | G06F 1/1626 361/679.4 |
| 2013/0148204 A1 | 6/2013 | Allen | |
| 2014/0349719 A1 | 11/2014 | Chun | |
| 2015/0124328 A1 | 5/2015 | Dorros | |
| 2015/0194998 A1* | 7/2015 | Fathollahi | H04B 1/3888 455/575.8 |
| 2015/0381785 A1* | 12/2015 | Gander | A45F 5/00 455/575.1 |
| 2016/0227663 A1* | 8/2016 | Holmes | G06F 1/1603 |
| 2016/0249472 A1* | 8/2016 | Tu | A45C 11/00 |
| 2017/0269642 A1 | 9/2017 | Codner | |
| 2017/0322590 A1* | 11/2017 | Jacobs | H04B 1/3888 |

* cited by examiner

Primary Examiner — Quan M Hua

(57) ABSTRACT

A foldable cellphone shade attachment for shading a cellphone screen to reduce glare includes a clip configured to selectively engage a first edge of a cellphone and a frame comprising a base and a plurality of support rods. The base has a rear side coupled to the clip and a pair of extensions perpendicularly extending along a second edge and a third edge of the cellphone. The plurality of support rods is pivotably coupled to the base and has a folded position resting on the base and an alternative open position extending upwardly from the base. A flexible cover is coupled to the frame. The cover is attached the base and each of the plurality of support rods and extends from the rear side of the base to the front support rod such that only a viewing opening remains uncovered in the open position.

14 Claims, 5 Drawing Sheets

FOLDABLE CELLPHONE SHADE ATTACHMENT

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to cellphone accessories and more particularly pertains to a new cellphone accessory for shading a cellphone screen to reduce glare.

BRIEF SUMMARY OF THE INVENTION

An embodiment of the disclosure meets the needs presented above by generally comprising a clip configured to selectively engage a first edge of a cellphone and a frame comprising a base and a plurality of support rods. The base has a rear side coupled to the clip and a pair of extensions perpendicularly extending along a second edge and a third edge of the cellphone. The plurality of support rods is pivotably coupled to the base and has a folded position resting on the base and an alternative open position extending upwardly from the base. The support rods comprise at least a front support rod and a secondary support rod with the front support rod in the open position forming a viewing opening to the cellphone. The secondary support rod in the open position extends between the front support rod and the base. A flexible cover is coupled to the frame. The cover is attached the base and each of the plurality of support rods and extends from the rear side of the base to the front support rod such that only the viewing opening remains uncovered in the open position.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
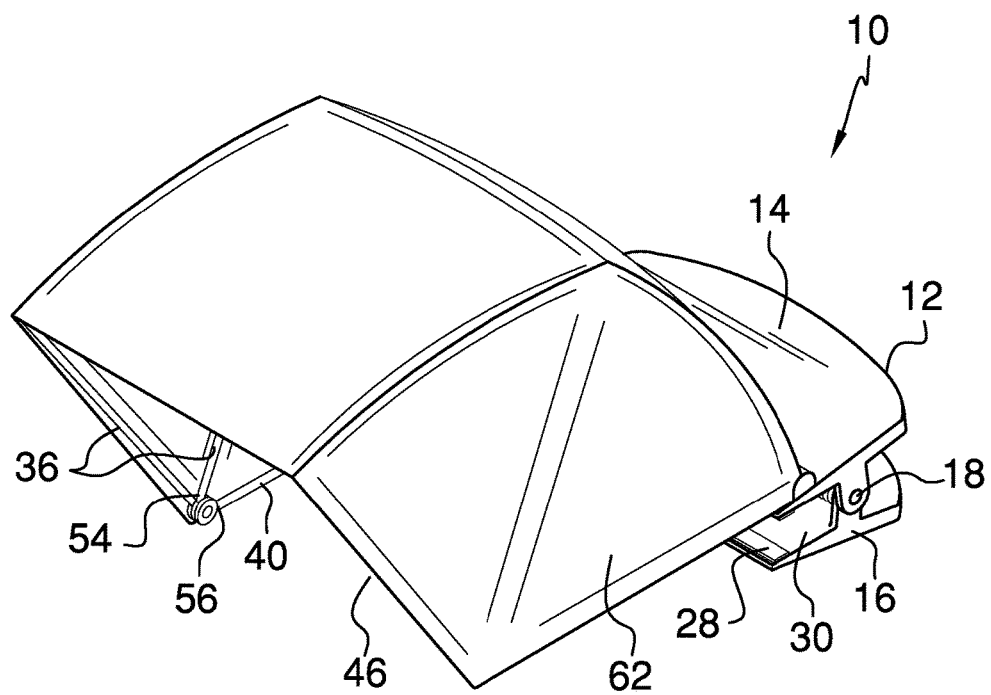
FIG. 1 is an isometric view of a foldable cellphone shade attachment according to an embodiment of the disclosure.
Figure 2:
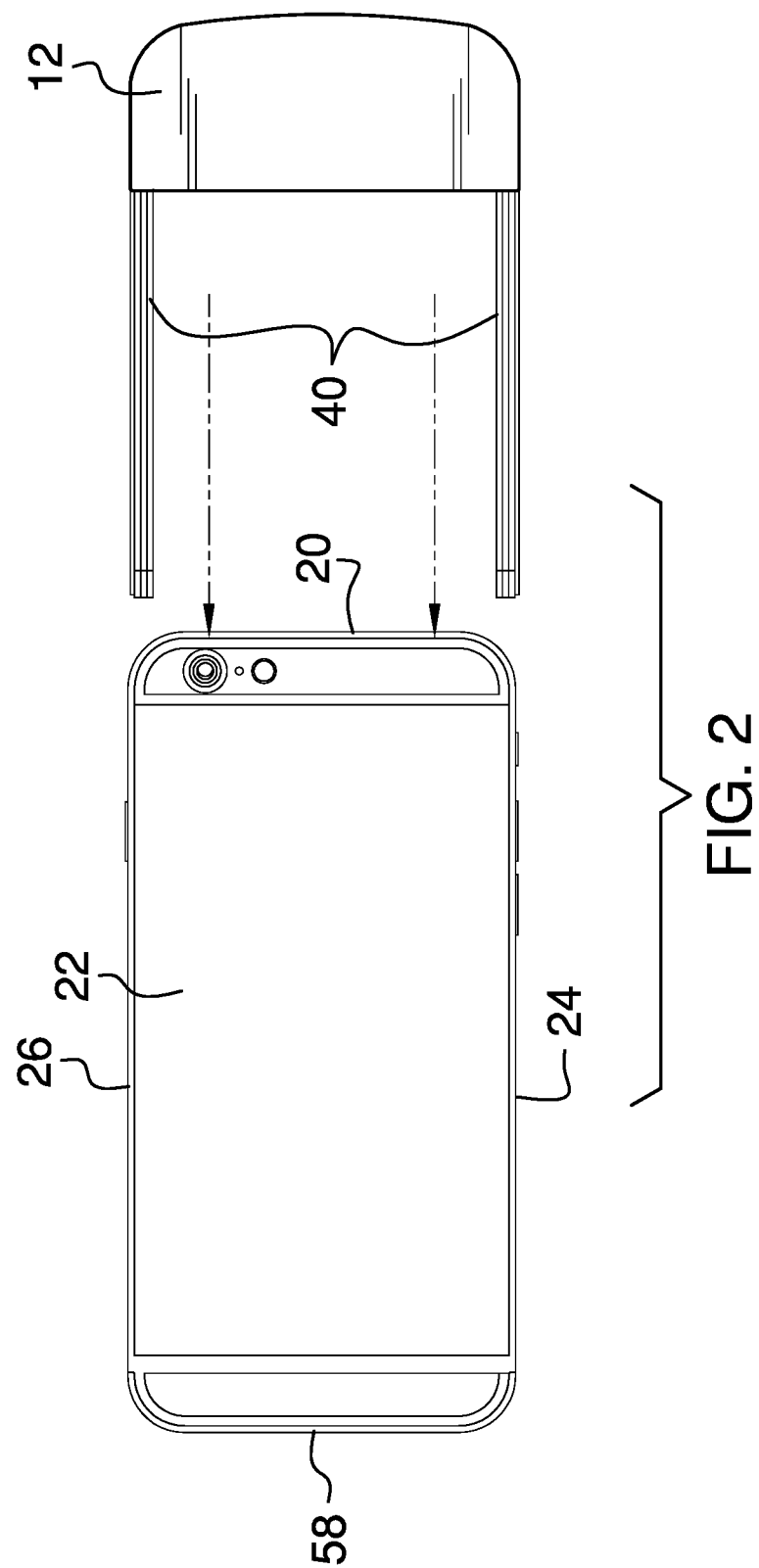
FIG. 2 is a bottom plan view of an embodiment of the disclosure.
Figure 3:
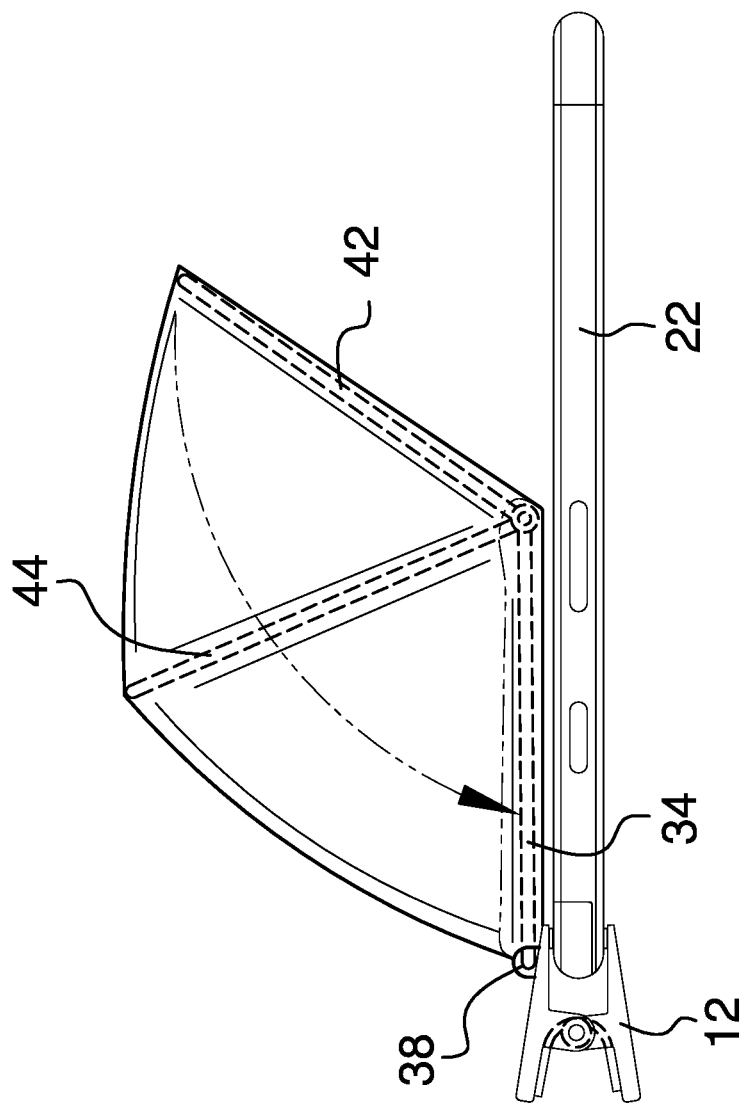
FIG. 3 is a side elevation in-use view of an embodiment of the disclosure.
Figure 4:
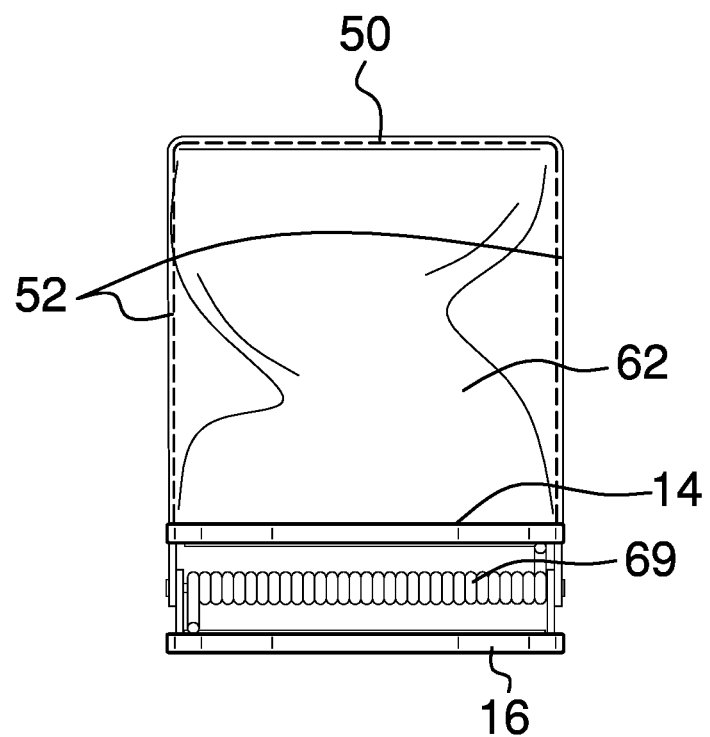
FIG. 4 is a rear elevation view of an embodiment of the disclosure.
Figure 5:
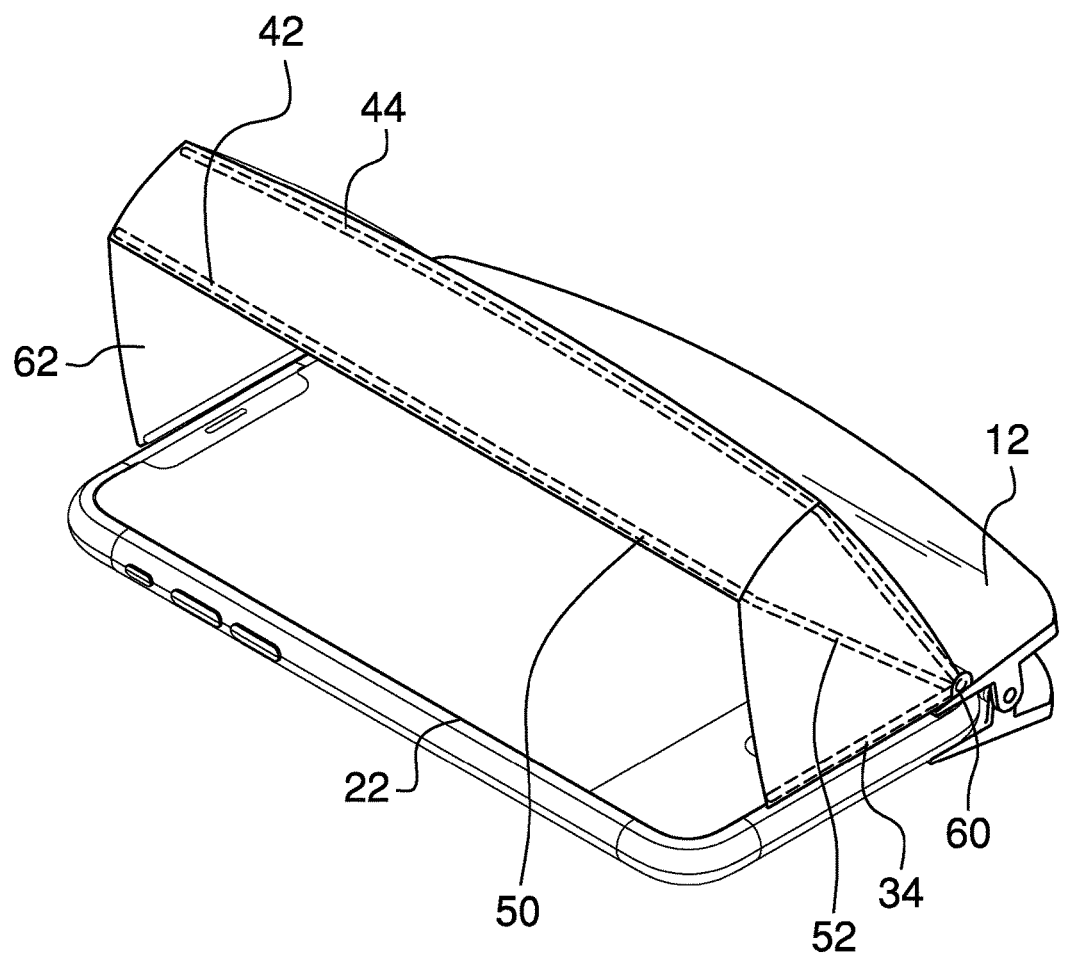
FIG. 5 is an isometric view of an alternative embodiment of the disclosure.

With reference now to the drawings, and in particular to FIGS. 1 through 5 thereof, a new cellphone accessory embodying the principles and concepts of an embodiment of the disclosure and generally designated by the reference numeral 10 will be described.

As best illustrated in FIGS. 1 through 5, the foldable cellphone shade attachment 10 generally comprises a clip 12 comprising a top half 14 and a bottom half 16 pivotably coupled along a hinge 18. The clip 12 has a spring 19 wound around the hinge 18 to force the clip 12 closed. The clip 12 is configured to selectively engage a top edge 20 of a cellphone 22 and extend from a left edge 24 to a right edge 26 of the cellphone. Each of the top half 14 and the bottom half 16 may have a felt pad 28 attached to an inner face 30 thereof to provide protection to the cellphone 22.

A frame 32 comprises a base 34 and a plurality of support rods 36. The base 34 has a rear side 38 coupled to the clip 12 and a pair of extensions 40 perpendicularly extending along the left edge 24 and the right edge 26 of the cellphone. The plurality of support rods 36 is pivotably coupled to the base 34 and has a folded position resting on the base 34 and an alternative open position extending upwardly from the base 34. The support rods 36 comprise at least a front support rod 42 and a secondary support rod 44 with the front support rod 42 in the open position forming a viewing opening 46 to the cellphone 22 and the secondary support rod 44 in the open position extending between the front support rod 42 and the base 34. Additional support rods may extend between the front support rod 42 and the base 34.

Each of the plurality of support rods 36 is U-shaped and comprises a cross bar 50 extending between a pair of posts 52 to match the shape of the base 34. Each of the posts 52 has a bottom end 54 pivotably coupled to a distal end 56 of each of the pair of extensions 40 of the base. When the plurality of support rods 36 is in the open position the front support rod 42 lies in a plane forming an angle with the plane of the base 34 between 45° and 90° and the secondary support rod 44 lies in a plane forming an angle with the plane of the base 34 between 45° and 75°, and the plane of the front support rod 42 and the plane of the secondary support rod 44 lie on opposite sides of a plane perpendicular to the plane of the base 34. These angles are configured to provide maximal shading while maintaining a large viewing opening 46.

In an alternative embodiment 11 the clip 12 is configured to couple to the left edge 24 or the right edge 26 of the cellphone and extends from the top edge 20 to a bottom edge 58. The pair of extensions 40 of the base extend along the top edge 20 and the bottom edge 58. The bottom end 54 of each of the posts 52 is pivotably coupled to a corner 60 of the base between the rear side 38 and each of the pair of extensions 40. When the plurality of support rods 36 is in the open position the front support rod 42 lies in a plane forming an angle with the plane of the base 34 between 45° and 90° and the secondary support rod 44 lies in a plane forming an angle with the plane of the base 34 between 45° and 75°, and the plane of the secondary support 44 rod forms an angle with the plane of the front support rod 42 between 15° and 45°.

In all embodiments a flexible cover 62 is coupled to the frame 32. The cover is attached to the base 34 and each of the plurality of support rods 36 and extends from the rear side 38 of the base to the front support rod 42 such that only the viewing opening 46 remains uncovered in the open position. The cover 62 may be a cloth material or any other flexible material which blocks sufficient light to cast a shadow over the cellphone 22 and to fold flat in the folded position.

In use, the clip 12 is attached to the cellphone 22 and the plurality of support rods 36 is unfolded to the open position to shield the cellphone 22 from light while allowing use through the viewing opening 46. When not in use, the plurality of support rods are returned to the folded position and the clip 12 is removed from the cellphone for storage.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A foldable cellphone shade attachment comprising:

a clip, the clip being configured to selectively engage a first edge of a cellphone;

a frame coupled to the clip, the frame comprising a base and a plurality of support rods, the base having a rear side coupled to the clip and a pair of extensions perpendicularly extending along a second edge and a third edge of the cellphone, the plurality of support rods being pivotably coupled to the base and having a folded position resting on the base and an alternative open position extending upwardly from the base;

the support rods comprising at least a front support rod and a secondary support rod, the front support rod in the open position forming a viewing opening to the cellphone, the secondary support rod in the open position extending between the front support rod and the base; and a flexible cover coupled to the frame, the cover being attached the base and each of the plurality of support rods and extending from the rear side of the base to the front support rod such that only the viewing opening remains uncovered in the open position.

2. The foldable cellphone shade attachment of claim 1 further comprising each of the plurality of support rods being U-shaped and comprising a cross bar extending between a pair of posts, each of the posts having a bottom end pivotably coupled to a distal end of each of the pair of extensions of the base.

3. The foldable cellphone shade attachment of claim 1 further comprising the front support rod lying in a plane forming an angle with the plane of the base between 45° and 90° when the plurality of support rods is in the open position.

4. The foldable cellphone shade attachment of claim 1 further comprising the secondary support rod lying in a plane forming an angle with the plane of the base between 45° and 75° when the plurality of support rods is in the open position.

5. The foldable cellphone shade attachment of claim 2 further comprising the first edge of the cellphone being a top edge and the second edge and the third edge being a left edge and a right edge of the cellphone.

6. The foldable cellphone shade attachment of claim 5 further comprising the pair of extensions of the base extending between one quarter and three quarters of the length of the second edge and the third edge of the cellphone.

7. The foldable cellphone shade attachment of claim 1 further comprising the clip having a top half and a bottom half being pivotably coupled along a hinge, the clip having a spring wound around the hinge to force the clip closed, each of the top half and the bottom half having a felt pad attached to an inner face thereof.

8. The foldable cellphone shade attachment of claim 1 further comprising each of the plurality of support rods being U-shaped and comprising a cross bar extending between a pair of posts, each of the posts having a bottom end pivotably coupled to a corner of the base between the rear side and each of the pair of extensions.

9. The foldable cellphone shade attachment of claim 8 further comprising the first edge of the cellphone being either a right edge or a left edge of the cellphone and the second edge and the third edge being the top edge and a bottom edge of the cellphone.

10. The foldable cellphone shade attachment of claim 9 further comprising the pair of extensions of the base extending between one quarter and three quarters of the length of the second edge and the third edge of the cellphone.

11. The foldable cellphone shade attachment of claim 9 further comprising the secondary support rod lying in a plane forming an angle with a plane of the front support rod between 15° and 45° when the plurality of support rods is in the open position.

12. The foldable cellphone shade attachment of claim 7 further comprising the clip extending from the second edge to the third edge of the cellphone.

13. A foldable cellphone shade attachment comprising:
- a clip comprising a top half and a bottom half, the top half and the bottom half being pivotably coupled along a hinge;
- the clip having a spring wound around the hinge to force the clip closed, each of the top half and the bottom half having a felt pad attached to an inner face thereof, the clip being configured to selectively engage a top edge of a cellphone and extending from a left edge to a right edge of the cellphone;
- a frame coupled to the clip, the frame comprising a base and a plurality of support rods, the base having a rear side coupled to the clip and a pair of extensions perpendicularly extending along the left edge and the right edge of the cellphone, the plurality of support rods being pivotably coupled to the base and having a folded position resting on the base and an alternative open position extending upwardly from the base;
- the support rods comprising at least a front support rod and a secondary support rod, the front support rod in the open position forming a viewing opening to the cellphone, the secondary support rod in the open position extending between the front support rod and the base;
- each of the plurality of support rods being U-shaped and comprising a cross bar extending between a pair of posts, each of the posts having a bottom end pivotably coupled to a distal end of each of the pair of extensions of the base, the front support rod lying in a plane forming an angle with the plane of the base between 45° and 90° when the plurality of support rods is in the open position, the secondary support rod lying in a plane forming an angle with the plane of the base between 45° and 75° when the plurality of support rods is in the open position, the plane of the front support rod and the plane of the secondary support rod lying on opposite sides of a plane perpendicular to the plane of the base; and
- a flexible cover coupled to the frame, the cover being attached the base and each of the plurality of support rods and extending from the rear side of the base to the front support rod such that only the viewing opening remains uncovered in the open position.

14. A foldable cellphone shade attachment comprising:
- a clip comprising a top half and a bottom half, the top half and the bottom half being pivotably coupled along a hinge;
- the clip having a spring wound around the hinge to force the clip closed, each of the top half and the bottom half having a felt pad attached to an inner face thereof, the clip being configured to selectively engage either a right edge or a left edge of a cellphone and extending from a top edge to a bottom edge of the cellphone;
- a frame coupled to the clip, the frame comprising a base and a plurality of support rods, the base having a rear side coupled to the clip and a pair of extensions perpendicularly extending along the top edge and the bottom edge of the cellphone, the plurality of support rods being pivotably coupled to the base and having a folded position resting on the base and an alternative open position extending upwardly from the base;
- the support rods comprising at least a front support rod and a secondary support rod, the front support rod in the open position forming a viewing opening to the cellphone, the secondary support rod in the open position extending between the front support rod and the base;
- each of the plurality of support rods being U-shaped and comprising a cross bar extending between a pair of posts, each of the posts having a bottom end pivotably coupled to a corner of the base between the rear side and each of the pair of extensions; the front support rod lying in a plane forming an angle with the plane of the base between 45° and 90° when the plurality of support rods is in the open position, the secondary support rod lying in a plane forming an angle with the plane of the base between 45° and 75° when the plurality of support rods is in the open position, the plane of the secondary support rod forming an angle with the plane of the front support rod between 15° and 45° when the plurality of support rods is in the open position; and
- a flexible cover coupled to the frame, the cover being attached the base and each of the plurality of support rods and extending from the rear side of the base to the front support rod such that only the viewing opening remains uncovered in the open position.

* * * * *